US008802263B2

(12) United States Patent
Heo

(10) Patent No.: US 8,802,263 B2
(45) Date of Patent: Aug. 12, 2014

(54) BATTERY PACK AND METHOD OF MANUFACTURING THE SAME

(75) Inventor: Sangdo Heo, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 794 days.

(21) Appl. No.: 12/461,893

(22) Filed: Aug. 27, 2009

(65) Prior Publication Data

US 2010/0075220 A1 Mar. 25, 2010

(30) Foreign Application Priority Data

Sep. 19, 2008 (KR) .................. 10-2008-0092001

(51) Int. Cl.
*H01M 2/02* (2006.01)
*H01M 6/46* (2006.01)

(52) U.S. Cl.
USPC ............ 429/99; 29/623.1; 429/149; 429/163; 429/175; 429/177

(58) Field of Classification Search
CPC ............ H01M 2/0202; H01M 2/0207; H01M 2/0217; H01M 2/0275; H01M 6/42; H01M 6/46; H01M 12/02; Y02E 60/12
USPC ......... 429/121, 149, 151, 156, 157, 159, 160, 429/163–167, 7, 96, 99, 100, 175–177; 29/2, 623.1
See application file for complete search history.

(56) References Cited

U.S. PATENT DOCUMENTS

| 5,354,625 | A * | 10/1994 | Bentz et al. ................... 429/407 |
| 6,114,942 | A * | 9/2000 | Kitamoto et al. ........... 338/22 R |
| 6,524,739 | B1 * | 2/2003 | Iwaizono et al. ............... 429/61 |
| 7,160,643 | B2 * | 1/2007 | Kunimoto et al. .............. 429/97 |
| 7,223,494 | B2 * | 5/2007 | Takeshita et al. .............. 429/123 |
| 2004/0029000 | A1 * | 2/2004 | Morita et al. ................. 429/162 |
| 2005/0130030 | A1 | 6/2005 | Watanabe et al. |
| 2006/0257731 | A1 * | 11/2006 | Yoon ............................. 429/176 |
| 2006/0266542 | A1 | 11/2006 | Yoon |
| 2007/0184341 | A1 * | 8/2007 | Yoon et al. .................... 429/152 |
| 2007/0207380 | A1 * | 9/2007 | Tononishi ..................... 429/176 |
| 2007/0279001 | A1 * | 12/2007 | Tononishi ..................... 320/112 |
| 2008/0198538 | A1 | 8/2008 | Chien |
| 2008/0241654 | A1 * | 10/2008 | Koh et al. ..................... 429/100 |
| 2009/0061301 | A1 * | 3/2009 | Planck .......................... 429/160 |
| 2009/0081485 | A1 * | 3/2009 | Heo ................................. 429/7 |

FOREIGN PATENT DOCUMENTS

| CN | 1937281 A | 3/2007 |
| CN | 101252172 A | 8/2008 |
| JP | 2003-257389 A | 9/2003 |
| JP | 2007-027020 A | 2/2007 |
| JP | 2007213941 | * 8/2007 |

(Continued)

OTHER PUBLICATIONS

Derwent Abstract for JP 2007/213941, published Aug. 2007.*

(Continued)

*Primary Examiner* — Joseph Drodge
(74) *Attorney, Agent, or Firm* — Lee & Morse, P.C.

(57) ABSTRACT

A battery pack and method of manufacturing the same, the battery pack including a battery, and a plurality of metal cases surrounding the battery, wherein the plurality of metal cases includes a first metal case and a second metal case and the first and second metal cases are welded to each other.

18 Claims, 4 Drawing Sheets

(56) References Cited

FOREIGN PATENT DOCUMENTS

| KR | 10-2006-0027618 A | 3/2006 |
|----|-------------------|--------|
| KR | 10 2006-0102747 A | 9/2006 |
| KR | 10 2007-0097146 A | 10/2007 |
| KR | 10 2008-0006103 A | 1/2008 |
| KR | 10-2008-0058965 A | 6/2008 |

OTHER PUBLICATIONS

Chinese Office Action in CN 200910171910.5, dated Aug. 18, 2011 (HEO).
Korean Office Action in KR 10 2008-0092001, dated Nov. 26, 2010 (HEO), Korean Office Action from prosecution of corresponding Korean application.
Chinese Third ($3^{rd}$) Office Action in CN 200910171910.5, dated Jul. 9, 2012 (HEO).

* cited by examiner

BATTERY PACK AND METHOD OF MANUFACTURING THE SAME

BACKGROUND

1. Field

Embodiments relate to a battery pack and a method of manufacturing the same.

2. Description of the Related Art

A secondary battery may use a nonaqueous liquefied electrolyte including, e.g., an organic solvent or a polymer electrolyte. The latter may be generally classified as a polymer battery. The secondary battery may include a lithium ion secondary battery.

A battery may include an electrode assembly and a pouch surrounding the electrode assembly. A protective circuit module and a case may be mounted to the battery cell in order to produce a battery pack.

The case may include a first metal case and a second metal case. The metal cases may be disposed on the outer side of the battery in order to protect the battery and eliminate electromagnetic interference (EMI) due to, e.g., electromagnetic waves transmitted from an external device.

The first metal case and the second metal case may be electrically connected to each other by, e.g., a metal bonding tape, in order to increase coupling efficiency and to be grounded.

SUMMARY

Embodiments are therefore directed to a battery pack and a method of manufacturing the same, which substantially overcome one or more of the problems due to the limitations and disadvantages of the related art.

It is therefore a feature of an embodiment to provide a battery pack including a plurality of metal cases disposed on the outer side of a battery and connected by welding the metal cases in order to effectively disperse electromagnetic waves transmitted from an external source.

At least one of the above and other features and advantages may be realized by providing a battery pack including a battery, and a plurality of metal cases surrounding the battery, wherein the plurality of metal cases includes a first metal case and a second metal case and the first and second metal cases are welded to each other.

The battery may be a polymer battery.

The first metal case and the second metal case may be resistance-welded or laser-welded.

The metal cases may include at least one of iron, aluminum, and stainless steel.

The battery may include a first surface and a second surface defined by the directions of width and thickness, a third surface and a fourth surface defined by the directions of height and thickness, a fifth surface and a sixth surface defined by the directions of width and height, a frame surrounding the first to fourth surfaces; and a protective circuit module between the first surface and the frame.

The first metal case may include a first plate covering the fifth surface, and a second plate covering the third surface and a third plate covering the fourth surface, and the second metal case may include a fourth plate covering the sixth surface, and a fifth plate covering the third surface and a sixth plate covering the fourth surface.

The first plate and the fourth plate may each have a width, and the width of the first plate may be wider than the width of the fourth plate.

The second plate may be disposed outside the fifth plate, and the third plate may be disposed outside the sixth plate.

The second plate and the fifth plate may be welded to each other.

The third plate and the sixth plate may be welded to each other.

The second plate and the fifth plate may be welded to each other and the third plate and the sixth plate may be welded to each other.

The second plate and the fifth plate may each include a corresponding center and opposing ends, and at least one of the center and opposing ends of the second plate may be welded to the at least one corresponding center and opposing end of the fifth plate.

The third plate and the sixth plate may each include a corresponding center and opposing ends, and at least one of the center and opposing ends of the third plate may be welded to the at least one corresponding center and opposing end of the sixth plate.

The second plate and the fifth plate and the third plate and the sixth plate may each include about 2 to about 10 welds.

The electrical resistance between the first metal case and the second metal case may be about 20 to about 30 milliohms.

At least one of the above and other features and advantages may also be realized by providing a battery pack including a battery, and a first metal case and a second metal case surrounding the battery and electrically connected to each other by welding to enhance the electromagnetic compatibility therebetween.

The battery may be a polymer battery.

At least one of the above and other features and advantages may also be realized by providing a method for manufacturing a battery pack including providing a battery including an electrode assembly, connecting the battery and a protective circuit module, surrounding the battery with a first metal case and a second metal case, and welding the first metal case and the second metal case to each other.

The step of providing a battery may include providing a polymer battery.

The first metal case and the second metal case may be resistance-welded or laser-welded.

The first metal case and the second metal case may be welded about 2 to about 20 times.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
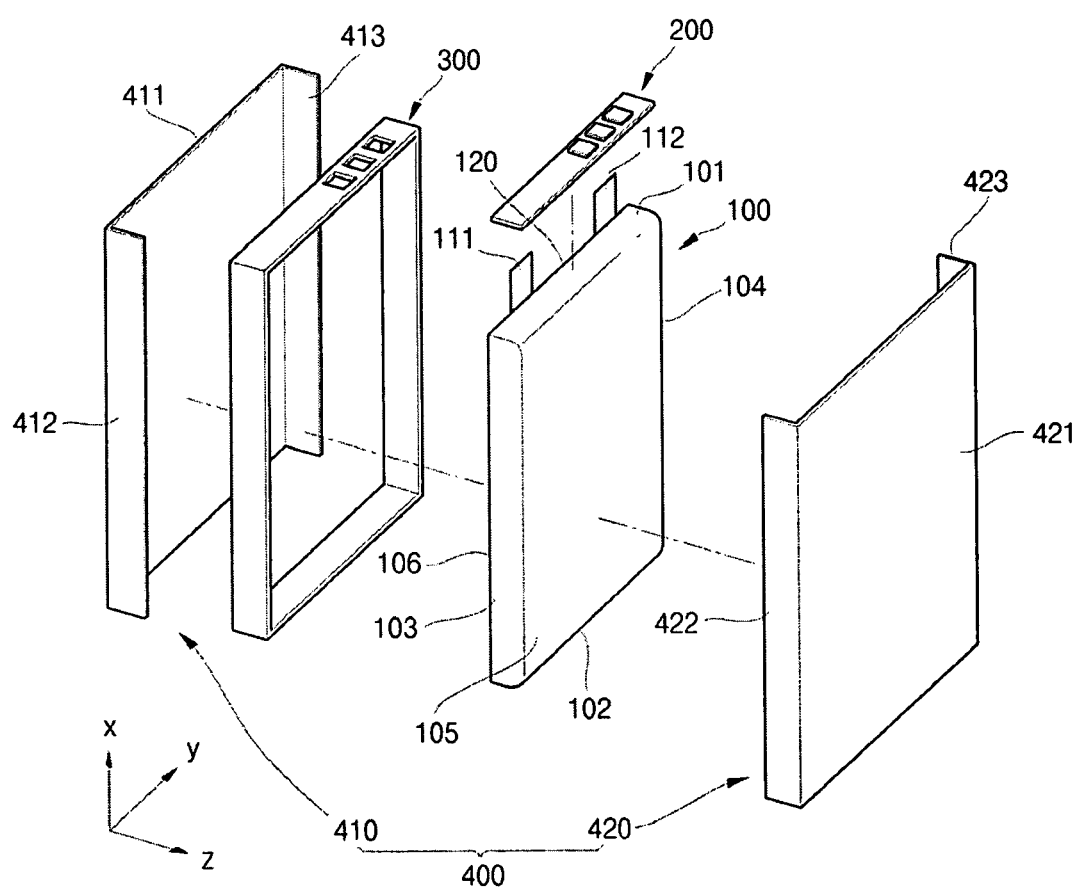
FIG. 1 illustrates an exploded perspective view of a battery pack according to an embodiment.

Korean Patent Application No. 10-2008-0092001, filed on Sep. 19, 2008 in the Korean Intellectual Property Office and entitled: "Polymer Battery Pack and Manufacturing Method for the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Details of the following embodiments are in the detailed description and the accompanying drawings. The advantages and features of the embodiments, and means for achieving them will be apparent with reference to the following embodiments that are described in detail with reference to the accompanying drawings. The same reference numerals indicate the same elements throughout the specification.

Figure 2:
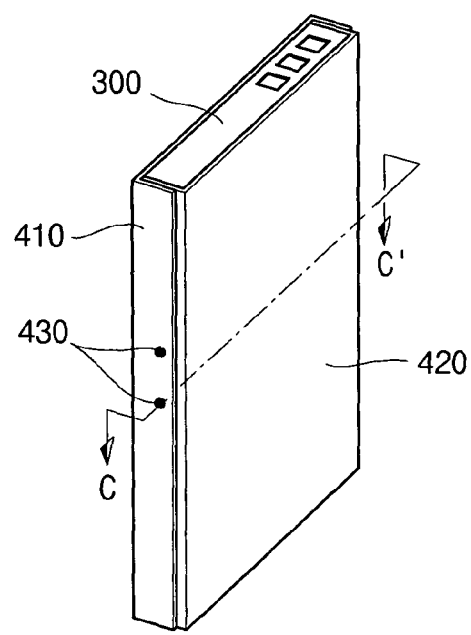
FIG. 2 illustrates a view of an assembled state of the battery pack according to the embodiment.

Hereinafter, battery packs according to embodiments will be described in detail with reference to accompanying drawings. FIGS. 1 and 2 illustrate a battery pack 10 according to an embodiment.

Referring to FIGS. 1 and 2, the battery pack 10 may include a battery 100, a protective circuit module 200 on the battery 100, and metal cases 400. The battery 100 may include, e.g., a polymer electrolyte battery. A frame 300 may be disposed between edges of the battery 100 and the metal cases 400. The metal cases 400 may include a plurality of metal cases, and may be electrically connected to each other by, e.g., welding, to decrease resistance between them. This will be described in detail below.

The battery 100 may include an electrode assembly (not shown) and a pouch 120 surrounding the electrode assembly. The electrode assembly may include a first electrode plate, a second electrode plate and a separator. The separator may be interposed between the first electrode plate and the second electrode plate, and the electrode assembly may be wound in a jelly-roll configuration. The electrode assembly may be sealed by the pouch 120 together with an electrolyte (not shown). The electrolyte may include, e.g., a polymer electrolyte. A first electrode tab 111 and a second electrode tab 112 protruding from the electrode assembly may be disposed on the upper surface of the pouch 120. The pouch 120 may include any suitable material for housing the electrode assembly and the electrolyte.

Surfaces of the battery 100 are defined in order to clarify the spatial relations between elements of the battery pack 10. In FIG. 1, the directional signs, x, y and z indicate the directions of height, width and thickness of the battery. The battery 100 may include a first surface 101 and a second surface 102 defined in the directions of width and thickness, a third surface 103 and a fourth surface 104 defined in the directions of height and thickness and a fifth surface 105 and a sixth surface 106 defined in the directions of width and height.

A protective circuit device and charge/discharge terminals may be electrically connected to each other by a conductive metal pattern on a substrate of the protective circuit module 200. The protective circuit module 200 may be disposed on the first surface 101 of the battery, and may be electrically connected to the first electrode tab 111 and the second electrode tab 112. The protective circuit module 200 may protect the battery 100 from, e.g., overcharge and overcurrent, and may prevent loss of efficiency due to overdischarge.

A frame 300 may surround the protective circuit module 200 and the first to fourth surfaces 101 to 104 of the battery. The frame 300 may be made of, e.g., plastic, to fix the battery 100 and the protective circuit module 200 and protect the devices from an external impact.

The metal cases 400 may include a first metal case 410 and a second metal case 420, which may cover the third to sixth surfaces 103 to 106 of the battery 100. The first metal case 410 may include a first plate 411 covering the fifth surface 105, and a second plate 412 and a third plate 413 covering the third surface 103 and the fourth surface 104. The second metal case 420 may include a fourth plate 421 covering the sixth surface 106 and a fifth plate 422 and a sixth plate 423 covering the third surface 103 and the fourth surface 104, respectively. The metal cases 400 may include, e.g., iron (Fe), aluminum (Al), and/or stainless steel.

When the metal cases 400 are disposed on the battery 100, the second plate 412 may be welded to the fifth plate 422. The third plate 413 may be welded to the sixth plate 423. The second plate 412 may be disposed outside of the fifth plate 422 and the third plate 413 may be disposed outside of the sixth plate 423. Accordingly, the inside width of the first plate 411 may be the sum of the inside width of the fourth plate 421 and the thicknesses of the fifth plate 422 and the sixth plate 423.

Figure 3:
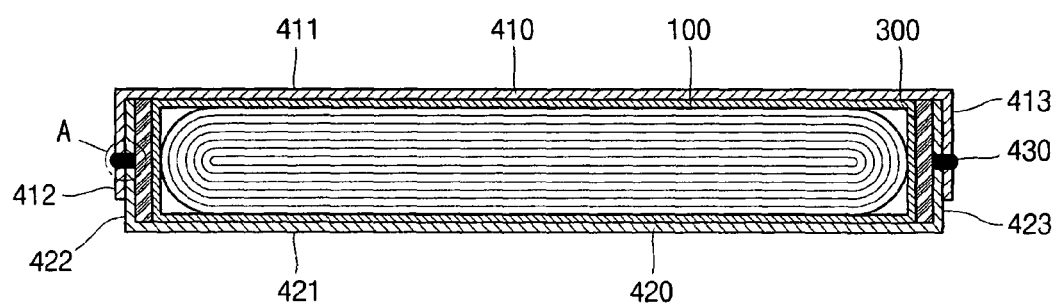
FIG. 3 illustrates a sectional view taken along line C-C' of FIG. 2.
Figure 4:
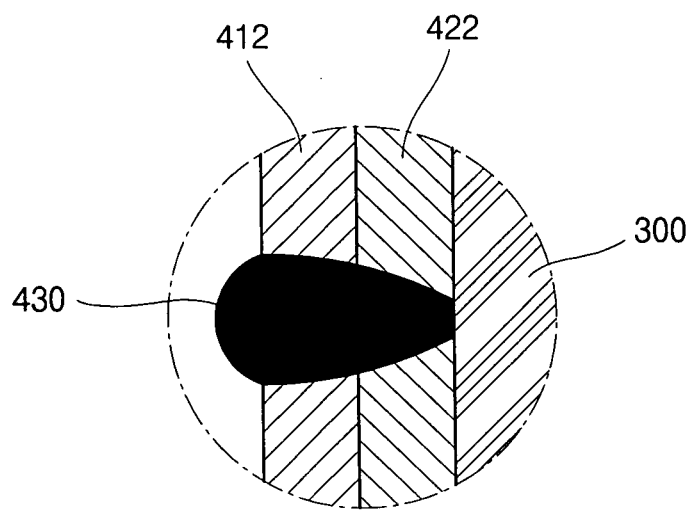
FIG. 4 illustrates an enlarged view of the region A of FIG. 3.
Figure 5:
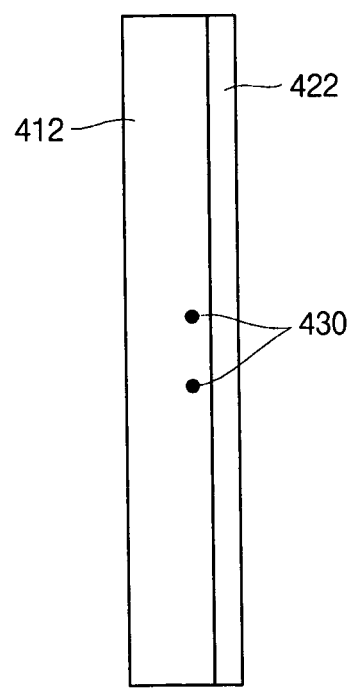
FIG. 5 illustrates a side view of the battery pack according to the embodiment.

FIG. 3 illustrates a sectional view taken along line C-C' of FIG. 2. FIG. 4 illustrates an enlarged view of the region A of FIG. 3. FIG. 5 illustrates a side view of the battery pack. In the drawings, the reference numeral 430 indicates welded portions.

Referring to FIGS. 3 to 5, the first metal case 410 and the second metal case 420 may be, e.g., resistance-welded or laser-welded. The second plate 412 of the first metal case 410 and the fifth plate 422 of the second metal case 420 may be, e.g., resistance-welded or laser-welded to each other. The third plate 413 of the first meal case 410 and the sixth plate 423 of the second metal case 420 may be, e.g., resistance-welded or laser-welded to each other. Either the second plate 412 and the fifth plate 422 or the third plate 413 and the sixth plate 423 may be welded to each other, but both options are possible.

In resistance welding, a large amount of current may flow through a weld root that is then heated and fused by heat due to contact resistance of a bonded portion, and then may be mechanically pressed. Resistance welding may include, e.g., butt welding, spot welding, and seam welding. In laser welding, a laser may be projected on a position where welding is desired to melt the metal.

In general, the battery pack 10 is used to supply power to an external electronic device. The protective circuit module 200 of the battery pack 10 and the external electronic device may generate electromagnetic waves. The electromagnetic waves may obstruct reception of signals to the external electronic device to which the battery pack 10 is connected and other electronic devices located in the vicinity of the external electronic device. This phenomenon is called electromagnetic interference (EMI).

The battery pack 10 may be connected to the external electronic device and may be influenced by the electromagnetic waves generated in the external electronic device and the battery pack 10. The metal cases 400 of the battery pack 10 may disperse the electromagnetic waves received from the external electronic device and alleviate the electromagnetic interference phenomenon. According to Maxwell's theory, an extremely small amount of current may flow through the metal cases 400 due to electromagnetic waves. The current may be generated by electromagnetic waves and flow through the first metal case 410 and the second metal case 420, and may be externally emitted through the ground (welded portion). It may be necessary to secure electrical conductivity between the first metal case 410 and the second metal case 420 and decrease the resistance between them in order to effectively eliminate the electromagnetic waves.

In a typical battery case the first metal case and the second metal case may be electrically connected to each other by a metal bonding tape, and the resistance between first and second metal cases and may be about 2 to about 10Ω. In the battery pack 10 according to an embodiment, the resistance between the welded first and second metal cases 410 and 420 may be about several milliohms. The resistance between the welded first and second metal cases 410 and 420 may be about 20 to about 30 mΩ. Accordingly, since the resistance between the first metal case 410 and the second metal case 420 of an embodiment may be very small, the electrical conductivity between them is excellent, thereby effectively dispersing and emitting the electromagnetic waves generated in the external electronic device. Accordingly, the battery pack 10 according to an embodiment may advantageously reduce electromagnetic interference (EMI) due to electromagnetic waves generated in an external electronic device and enhance the electromagnetic compatibility (EMC) between the external device and the battery pack 10.

Figure 6:
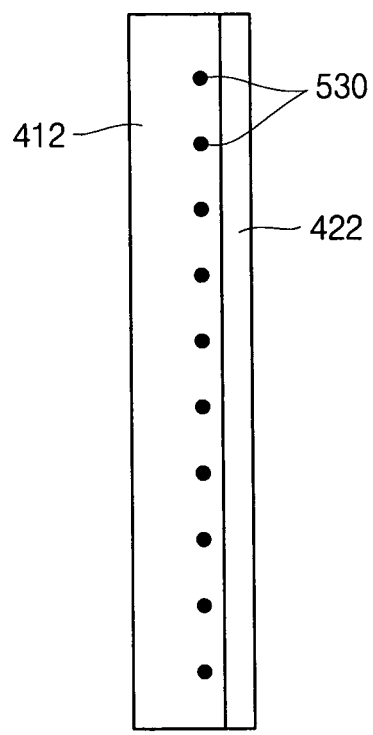
FIG. 6 illustrates a side view of a battery pack according to another embodiment.

FIG. 6 illustrates a side view of a pack according to another embodiment. In the drawing, the reference numeral 530 indicates welded portions.

Referring to FIG. 6, at least one of the center, an end and/or another end of the side of the folded second plate 412 and fifth plate 422 of the metal cases 400 may be welded. Although not illustrated, at least one of the center, a side and/or another side corresponding to the side of the folded third plate 413 and sixth plate 423 corresponding to the second plate 412 and fifth plate 422 may also be welded.

The second plate 412 may be welded to the fifth plate 422 at two or more points. The third plate 413 may also be welded to the sixth plate 423 at two or more points. In particular, each side of the metal cases may be welded at about two to about ten points. As the number of welds increases, the assembly time may increase, but the coupling force between the first metal case 410 and the second metal case 420 may be enhanced and the resistance between them may decrease.

When the resistance between the metal cases and the bonding tape is low, the electrical conductivity between the metal cases becomes higher and the cases may be able efficiently interrupt electromagnetic waves. However, the resistance between the bonding tape and the metal cases is high, e.g., several ohms, and there is a limit to how much this may be decreased.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
a battery; and
a plurality of metal cases surrounding the battery, wherein the plurality of metal cases includes a first metal case and a second metal case and the first and second metal cases are welded to each other,
wherein the battery includes:
a first surface and a second surface defined by the directions of width and thickness;
a third surface and a fourth surface defined by the directions of height and thickness;
a fifth surface and a sixth surface defined by the directions of width and height;
a frame surrounding the first to fourth surfaces, the frame including an opening exposing the fifth surface and an opening exposing the sixth surface; and
a protective circuit module between the first surface and the frame,
wherein the first metal case includes:
a first plate covering the fifth surface; and
a second plate covering the third surface and a third plate covering the fourth surface, and
wherein the second metal case includes:
a fourth plate covering the sixth surface; and
a fifth plate covering the third surface and a sixth plate covering the fourth surface.

2. The battery pack as claimed in claim 1, wherein the battery is a polymer battery.

3. The battery pack as claimed in claim 2, wherein the electrical resistance between the first metal case and the second metal case is about 20 to about 30 milliohms.

4. The battery pack as claimed in claim 2, wherein the first metal case and the second metal case are resistance-welded or laser-welded.

5. The battery pack as claimed in claim 2, wherein the metal cases include at least one of iron, aluminum, and stainless steel.

6. The battery pack as claimed in claim 1, wherein the first plate and the fourth plate each have a width, and the width of the first plate is wider than the width of the fourth plate.

7. The battery pack as claimed in claim 1, wherein the second plate is disposed outside the fifth plate, and the third plate is disposed outside the sixth plate.

8. The battery pack as claimed in claim 1, wherein the second plate and the fifth plate are welded to each other.

9. The battery pack as claimed in claim 1, wherein the third plate and the sixth plate are welded to each other.

10. The battery pack as claimed in claim 1, wherein the second plate and the fifth plate are welded to each other and the third plate and the sixth plate are welded to each other.

11. The battery pack as claimed in claim 10, wherein the second plate and the fifth plate each include a corresponding center and opposing ends, and at least one of the center and opposing ends of the second plate is welded to the at least one corresponding center and opposing end of the fifth plate.

12. The battery pack as claimed in claim 10, wherein the second plate and the fifth plate and the third plate and the sixth plate each include about 2 to about 10 welds.

13. The battery pack as claimed in claim 1, wherein the third plate and the sixth plate each include a corresponding center and opposing ends, and at least one of the center and opposing ends of the third plate is welded to the at least one corresponding center and opposing end of the sixth plate.

14. A battery pack, comprising:

a battery; and a first metal case and a second metal case surrounding the battery and electrically connected to each other by welding to enhance the electromagnetic compatibility therebetween, wherein the battery includes:

a first surface and a second surface defined by the directions of width and thickness;

a third surface and a fourth surface defined by the directions of height and thickness;

a fifth surface and a sixth surface defined by the directions of width and height;

a frame surrounding the first to fourth surfaces, the frame including an opening exposing the fifth surface and an opening exposing the sixth surface; and a protective circuit module between the first surface and the frame, wherein the first metal case includes:

a first plate covering the fifth surface; and a second plate covering the third surface and a third plate covering the fourth surface, and wherein the second metal case includes:

a fourth plate covering the sixth surface; and a fifth plate covering the third surface and a sixth plate covering the fourth surface.

15. The battery pack as claimed in claim 14, wherein the battery is a polymer battery.

16. A method for manufacturing a battery pack, comprising:

providing a battery including an electrode assembly;

connecting the battery and a protective circuit module;

surrounding the battery with a first metal case and a second metal case; and welding the first metal case and the second metal case to each other such that the first metal case and the second metal case are welded about 2 to about 20 times, wherein the battery includes:

a first surface and a second surface defined by the directions of width and thickness;

a third surface and a fourth surface defined by the directions of height and thickness;

a fifth surface and a sixth surface defined by the directions of width and height; and a frame surrounding the first to fourth surfaces, the frame including an opening exposing the fifth surface and an opening exposing the sixth surface, wherein the first metal case includes:

a first plate covering the fifth surface; and a second plate covering the third surface and a third plate covering the fourth surface, and wherein the second metal case includes:

a fourth plate covering the sixth surface; and a fifth plate covering the third surface and a sixth plate covering the fourth surface.

17. The method as claimed in claim 16, wherein the step of providing a battery includes providing a polymer battery.

18. The method as claimed in claim 17, wherein the first metal case and the second metal case are resistance-welded or laser-welded.

* * * * *